April 11, 1939.  H. B. BELL, JR  2,153,544
NONFREEZING WINDSHIELD WIPER
Filed March 18, 1938
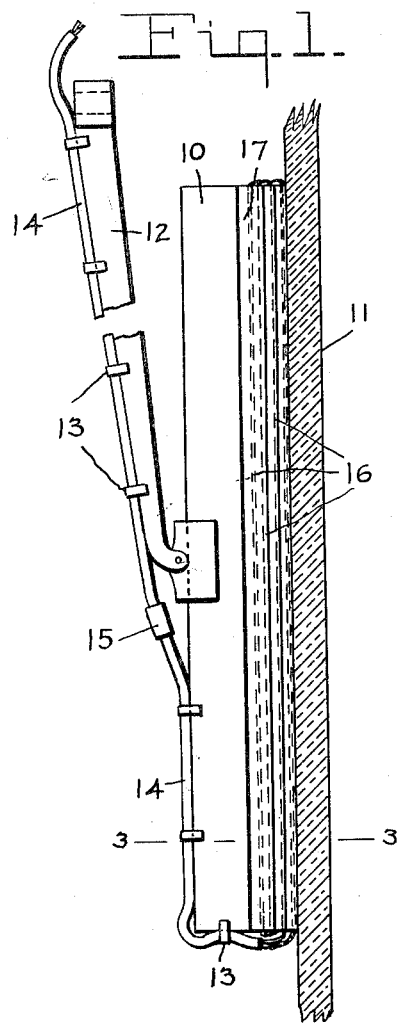
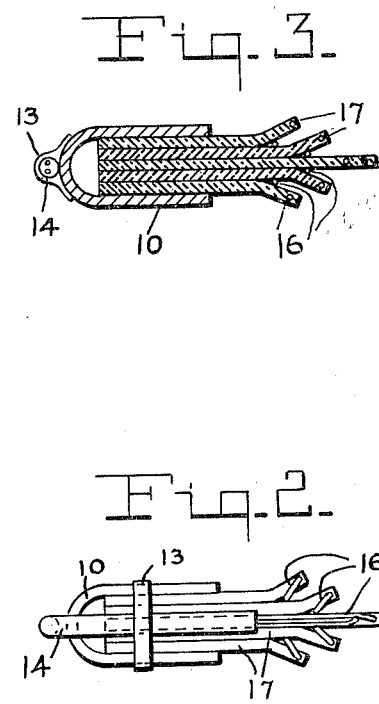
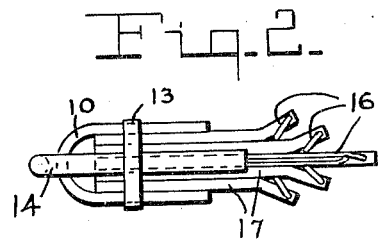
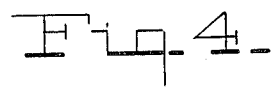
Inventor
Harman Brown Bell, Jr.
By
Ransom K. Davis
Attorney Patented Apr. 11, 1939

2,153,544

UNITED STATES PATENT OFFICE 2,153,544

NONFREEZING WINDSHIELD WIPER

Harman B. Bell, Jr., United States Navy

Application March 18, 1938, Serial No. 196,671

1 Claim. (Cl. 15—250)

(Granted under the act of March 3, 1883, as amended April 30, 1928; 370 O. G. 757)

This invention is designed to prevent snow, sleet, or ice from forming on the windshield wiper blade, as commonly used on motor vehicles, or on the surface of the windshield between successive strokes of the windshield wiper blade across the surface of the windshield.

The principal object of this invention is the provision of a windshield wiper in which wiper blade is heated by conductors through which flows an electric current from the electric battery of the motor vehicle. This prevents the formation of ice on the windshield wiper blade or on the rubber strips of the blade; and causes any snow, sleet, or ice which falls on the windshield wiper blade, or on the rubber strips of the windshield wiper blade, to melt. The water from the melted snow, sleet, or ice is applied to the surface of the windshield by the passage, or strokes, of the windshield wiper blade over the surface of the windshield and this water acts to melt any snow, sleet, or ice which falls on and tends to freeze to the surface of the windshield between successive strokes of the windshield wiper blade. In this way, as it passes over the surface of the windshield, the windshield wiper blade is not raised from the surface of the windshield by the formation of snow, sleet, or ice on the surface of the windshield or on the windshield wiper blade, and the windshield wiper blade is thereby able to keep the surface of the windshield over which it passes clear and free from snow, sleet, or ice.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claim.

In order to make the invention more clearly understood, there are shown in the accompanying drawing, means for carrying the invention into practical use, without limiting the improvements in their useful application to the particular construction, which, for the purpose of explanation, have been made the subject of illustration.

In the accompanying drawing:

Figure 1 is a side elevational view of a windshield wiper embodying the invention;

Figure 2 is an end view of the wiper shown in Figure 1 on a larger scale;

Figure 3 is transverse sectional view on a larger scale taken on line 3—3 of Figure 1, and Figure 4 is a fragmentary longitudinal sectional view through the blade and showing one way of mounting the heating element thereon.

In Figure 1 is shown a side view of a windshield wiper blade 10, as commonly used on motor vehicles, on the surface of the windshield 11. Attached to the windshield wiper blade 10, and to the windshield wiper arm 12, by suitable clips 13, is a flexible waterproof double conductor electric wire cable 14. This wire cable is connected to the electric battery of the motor vehicle through an "on and off" switch (not shown) installed on the dashboard of the car. This cable 14 is fitted with a double plug and socket connection 15 so as to facilitate renewal of windshield wiper blades 10 without disturbing the wire cable 14 on the arm 12 of the windshield wiper.

In Figure 2 is shown the end view of the windshield wiper blade 10, with the wire cable 14 attached to the blade by the clip 13. The conductors 16 of the wire cable 14 are led to, and imbedded in, the rubber strips 17 of the windshield wiper blade 10; or they may be woven between and through the rubber strips, as shown in Figures 3 and 4. The conductors 16 are led back and forth, imbedded in, or woven between and through the rubber strips 17 as described above, from one end of the blade 10 to the other, so as to form a closed circuit. The resistance of this circuit is such that the wire conductors 17, when connected to the electric battery by the wire cable 14 with the switch turned on, become well heated, but not heated to such an extent that the rubber strips 17 become damaged by the heat.

It should be understood that the present disclosure is for the purpose of illustration only and that this invention includes all modifications and equivalents which fall within the scope of the appended claim.

The invention described herein may be manufactured and/or used by or for the Government of the United States of America for governmental purposes without the payment of any royalties thereon or therefor.

I claim:

A windshield wiper for motor vehicles comprising a blade adapted to be moved over a portion of a windshield to provide clear vision therethrough and an electrical heating element passing at intervals through the material of said blade in opposite directions so that portions of said conductor extend at intervals along opposite sides of said blade, said heating element being connected with a source of electric energy for melting ice and snow on said windshield.

HARMAN B. BELL. JR.